United States Patent Office 3,562,218
Patented Feb. 9, 1971

3,562,218
COPOLYMERS OF ACETYLENIC ACRYLATES
AND METHACRYLATES
Gaetano F. D'Alelio, South Bend, Ind., assignor to Geigy Chemical Corporation, Ardsley, N.Y., a corporation of New York
No Drawing. Filed June 28, 1968, Ser. No. 740,973
Int. Cl. C08f 15/18
U.S. Cl. 260—67
13 Claims

ABSTRACT OF THE DISCLOSURE

The copolymers disclosed herein are of acetylenic acrylates and methacrylates having the formula $CH_2=C(R)COO-Z-C\equiv CH$ wherein R represents hydrogen or methyl and Z represents a divalent hydrocarbon radical of at least 2 carbon atoms. Polymerization of the acetylenic acrylates and methacrylates in free radical polymerizations generally result in crosslinked or gelled products since the free radicals will activate polymerization through the acetylenic as well as through the acrylic unsaturation. Therefore the copolymers are advantageously prepared by anionic polymerization. The comonomers are those which are copolymerizable with acrylates and methacrylates in anionic polymerizations. Typical comonomers are styrene, its homologs and derivatives, monounsaturated acrylates and methacrylates, acrylonitrile, vinyl esters, vinyl chloride, vinylidene chloride, monoalphaolefins, etc. The copolymers are particularly valuable for post-treatment and postreactions, such as bromination, decaboronation, thermal and radical crosslinking, Mannich reaction with an aldehyde and ammonia or a mono- or di-substituted amine, or reactions with nitrile oxides, aldehydes, ketones, epoxides, sodamide, etc. The copolymers can be tailored to give ultimate properties according to the type and the proportion of comonomers and the proportion of acetylenic groups as well as the type of postreactant or post-treatment.

BACKGROUND OF THE INVENTION

Field of the invention

This invention relates to copolymers of acetylenic acrylates and methacrylates with comonomers. More specifically, it relates to copolymers with comonomers capable of copolymerization with the acetylenic acrylates in anionically activated polymerizations.

Related prior art

Some monomeric acetylenic acrylates and methacrylates and their homopolymers are disclosed in a doctorate thesis submitted in 1965 by Robert C. Evers to the Graduate School of the University of Notre Dame. However, the homopolymers of these are found to have certain disadvantages and are more difficult to control in postreactions because of the high degree of unsaturation in the unpolymerized acetylenic radicals.

However, no polymers are shown of acetylenic acrylates or methacrylates having four carbons or more in the acetylenic group and having a terminal acetylene ($-C\equiv CH$) group. Propargyl acrylate and methacrylate homopolymers are shown but these are more inclined to crosslink and have other disadvantages as shown hereinafter. Moreover, copolymers of 1-acryloxy-2-butyne (2-butyne-1-yl acrylate) and 1-methacryloxy-2-butyne (2-butyne-yl methacrylate) are shown but these do not have terminal acetylene groups.

STATEMENT OF THE INVENTION

In accordance with the present invention, it has now been found that the disadvantages of having high concentrations of unsaturated acetylenic groups present during postreaction or ultimate other treatments or uses of the homopolymers are avoided by forming copolymers of acetylenic acrylates and methacrylates of the formula $CH_2C(R)COO-Z-C\equiv CH$, wherein R is hydrogen or methyl and Z is a divalent hydrocarbon radical of at least 2 carbon atoms, with a comonomer copolymerizable with the acetylenic acrylate or methacrylate under anionic activation. The copolymer can be tailored for ultimate properties according to the type and proportion of comonomer, the proportion of acetylenic acrylate or methacrylate and the type of postreactant or treatment effected on the acetylenic groups. Advantageously there is at least 15% by weight of the comonomer present, preferably 50% or more of the comonomer, and at least 1%, preferably at least 5% of the acetylenic acrylate or methacrylate present in the copolymer molecules.

Therefore, where it is desirable to impart certain properties to polymers of various polymerizable monomers such as the acrylates, methacrylates, styrenes, acrylonitrile, vinyl esters, vinyl chloride, vinylidene chloride, monoalpha-olefins, e.g. propylene, butene-1, isobutylene, pentene-1, etc., this is possible by copolymerizing with such monomers at least 1%, preferably at least 5% of the above-described acetylenic acrylate to produce the copolymers of this invention which are readily susceptible to post-treatments and postreactions for production of the desired properties in the copolymers.

The Z group can be any divalent hydrocarbon group having at least two carbon atoms and preferably one having no more than 10 carbon atoms. It is found that acetylenic groups of four or more carbon atoms give polymer products of improved properties as compared to the corresponding propargyl acrylate polymers, such as greater solubility in lower cost solvents, improved water-resistance, and better ductility and flexibility. Typical groups include ethyelne, phenylmethylene, methylmethylene (ethylidene), ethylmethylene, cyclohexylmethylene, cycloheptylmethyiene, tolylmethylene, benzylmethylene, phenylethylene, trimethylene, pentamethylene, octamethylene, decamethylene, dodecamethylene, phenylene, tolylene, naphthylene, cyclohexylene, cycloheptylene, etc.

While the Z groups listed above do not contain ethylenic unsaturation, such groups containing ethylenic unsaturation can be used, although there is no particular advantage in their use, provided that the unsaturation does not cause premature crosslinking during the preparation of linear polymers.

Typical acetylenic esters that can be used are the following acrylates and methacrylates:

3-butyne-2-yl,
3-butyne-1-yl,
1-phenyl-3-butyne-1-yl,
1-cyclohexyl-3-butyne-1-yl,
1-benzyl-3-butyne-1-yl,
1-phenethyl-3-butyne-1-yl,
1-cycloheptyl-3-butyne-1-yl,
1-propyl-3-butyne-1-yl,
1-amyl-3-butyne-1-yl,
1-hexyl-3-butyne-1-yl,
2-phenyl-3-butyne-1-yl,
4-pentyne-1-yl,
4-pentyne-2-yl,
4-pentyne-3-yl,
1-phenyl-4-pentyne-1-yl,
1-cyclohexyl-4-pentyne-1-yl,
1-benzyl-4-pentyne-1-yl,
1-phenethyl-4-pentyne-2-yl,
1-propyl-4-pentyne-3-yl,
5-hexyne-1-yl,
5-hexyne-2-yl, 7-octyne-2-yl,
9-decyne-1-yl,
p-ethynylphenyl, 4-ethynyl-1-naphthyl,
4-ethynyl-1-cyclohexyl,
p-ethynylbenzyl,
4-ethynylcyclohexylmethyl,
etc.

Typical comonomers that can be used in forming the copolymers include the following monounsaturated acrylates and methacrylates: methyl, ethyl, propyl, butyl, amyl, octyl, decyl, phenyl, tolyl, xylyl, ethylphenyl, naphthyl, diphenyl (phenylphenyl), benzyl, phenethyl, methylcycloheptyl, etc.; styrene and its various homologs and derivatives such as vinyl naphthalene, methylvinylnaphthalene, vinyl toluene, vinyl xylene, vinyl ethylbenzene, α-methylstyrene, vinyl diphenyl, methylvinyldiphenyl, etc.; vinyl esters, such as vinyl acetate, vinyl benzoate, methylvinylphthalate, vinyl butyrate, etc.; vinyl chloride, vinylidene chloride, acrylonitrile, etc.

In attempting to polymerize or copolymerize the acetylenic acrylates and methacrylates used in the practice of this invention, the use of free radical-generating activators, such as peroxy compounds, azo compounds, etc. generally result in a substantial degree of polymerization in the acetylenic unsaturation as well as in the ethylenic unsaturation with resultant crosslinking and a high degree of gellation. While a small amount of gellation is permissible, in which case the gell can be separated and the remaining ungelled polymer can be used, it is undesirable to have a high proportion of gelled polymer since it is difficult to post-treat or postreact a polymer in this form.

Therefore, the copolymers of this invention are advantageously prepared by anionic activators which produce little or no polymerization in the acetylenic unsaturation. Where there is a small amount of such polymerization, resulting in such a small amount of gell formation that it can be tolerated, the ungelled portion of the polymer is recovered and then processed as described hereinafter. In such cases, the gelled portion can be brominated and used as non-inflammable filler in resins and other compositions.

Methods disclosed in the literature for conducting both random and block copolymerizations are suitable for the purpose of this invention. Suitable anionic polymerizations are described in D'Alelio U.S. Pats. Nos. 3,203,915, particularly columns 14–16, and 3,309,423, running from line 51 in column 3 through line 55 of column 7. Typical anionic activators are also disclosed therein.

For example the anionic polymerization can be initiated by alkali metal hydrides such as NaH, LiH, KH, CsH, including various complexes thereof, such as the metal alkyls of Li, Na, K and Cs with the hydrocarbon group being methyl, ethyl, propyl, isopropyl, butyl, amyl, isoamyl, benzyl, triphenylmethyl, phenyl, naphthyl, octyl, etc., preferably containing no more than 12 carbon atoms in a hydrocarbon group.

Also suitable are Grignard reagents having the formula R″MgX, where R″ is a hydrocarbon group as listed above and X is halogen. Typical examples of these are phenyl magnesium bromide, butyl magnesium bromide and chloride, vinyl magnesium bromide, allyl magnesium bromide, etc.

The free alkali metals such as lithium, sodium and potassium can also be used as initiators, including combinations of alkali metals and aromatic compounds such as naphthalene, anthracene, α-methyl styrene tetramer, styrene, etc. and liquid ammonia solutions of the alkali metals. Also suitable are ketyls which are the reaction products of alkali or alkaline earth metals with ketones, such as benzophenone in ether, for example the sodium reaction product of benzophenone, etc.

Solvents or diluents may be used, if desired, and these can be selected from the class of aliphatic and aromatic hydrocarbons, ketones, ethers, and esters, such as butane, propane, hexane, cycloheptane, octane, benzene, toluene, xylene, dimethyl ether, diethyl ether, dibutyl ether, tetrahydrofurane, dioxane, diphenyl ether, dibenzyl ether, dimethyl ethyleneglycol ether, dibutyl ethylene glycol ether, diethyl diethylene glycol ether, etc.

The anionic polymerization can be carried out at temperatures ranging from −80° C. to about 80° C. Although the range of −40° C. to 60° C. is advantageous, it is generally more practical to operate in the range of −20° C. to 40° C.

The anionic polymerizations produced linear polymers having a plurality of repeating units of the formula

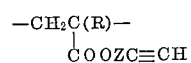

The linear polymer chain also has other repeating units therein which are derived from the comonomers, such as the monounsaturated acrylates and methacrylates and styrene, which have repeating units which can be represented as follows:

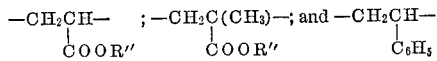

wherein R″ is a hydrocarbon radical, preferably of 1–8 carbon atoms.

One of the chief advantages of the copolymers of this invention is that it allows broad and versatile modification of polymer properties. Thus, when a high proportion of the comonomer is used, the properties resemble those of the homopolymers of such comonomers and by having copolymerized therewith an acetylenic acrylate or methacrylate as in this invention, it is possible to postreact or post-treat the resultant copolymers so as to permit modifications in a manner desired from the properties that the polymer of the comonomer by itself would possess. For example, polymethylmethacrylate has little flame resistance. By producing a copolymer of methyl methacrylate with acetylenic acrylate or methacrylate monomer as taught in the present application, it is possible to postbrominate the copolymer and thereby produce a polymer resembling polymethmethacrylate in a number of respects in accordance with the proportion of methylmethacrylate repeating units therein and simultaneously imparting flame resistance to the copolymer in accordance with the porportion of brominated acetylenic acrylate or methacrylate repeating units therein. Flame resistance can likewise be imparted to acetylenic copolymers of the acrylates, methacrylates styrene, and other comonomers indicated above.

In addition, various other postreactions and post-treatments can be conducted on the copolymers of this invention, such as: decarboronation by reaction with decaborane; crosslinking by the application of heat or the generation of free radicals, with or without other monomers present; the Mannich reaction with an aldehyde and ammonia or a mono- or di-substituted amine; reaction with nitrile oxides; reaction with aldehydes in the presence of a base such as NaOH, etc., producing primary alcohols when processed with formaldehyde and secondary alcohols when using ther aldehydes; reactions with ketones in the presence of an alkali metal base to produce tertiary alcohols; reaction with ethylene oxide or other epoxide including diepoxides; conversion to metallic derivatives by dissolving or suspending the polymer in ammonia and adding sodamide or forming it in situ by the addition of sodium metal to the ammonia, or by the addition of butyl lithium to the ammonia; and the formation of copper, zinc, cobalt or other salts by adding salts of such metals to a dioxane solution of the sodium or lithium salt of the polymer.

The various reactions are illustrated schematically as follows:

(1) Postbromination:

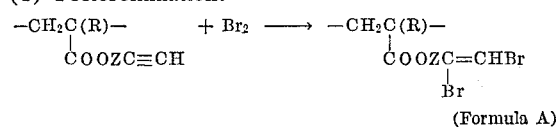

(Formula A)

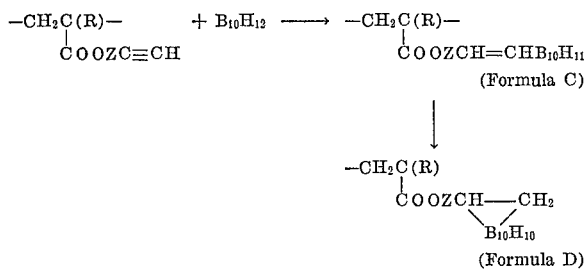

(Formula B)

(2) Decaboronation:

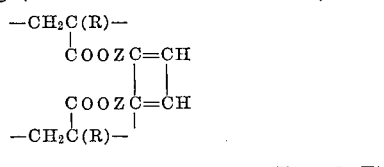

(Formula C)

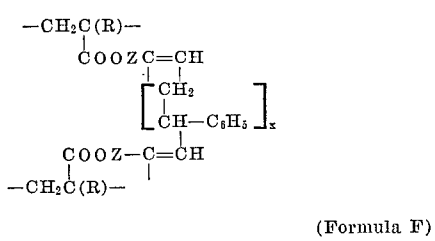

(Formula D)

(3) Crosslinking (without another comonomer):

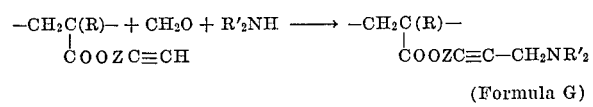

(Formula E)

(3a) Crosslinking (with styrene as comonomer):

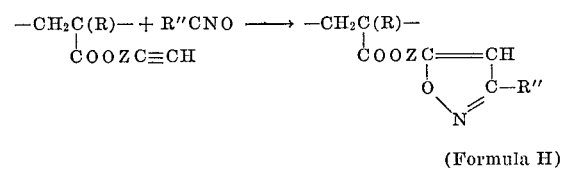

(Formula F)

(4) Mannich reaction:

−CH₂C(R)− + CH₂O + R'₂NH ⟶ −CH₂C(R)−
   |                                |
   COOZC≡CH                         COOZC≡C−CH₂NR'₂

(Formula G)

(R' is hydrogen or hydrocarbon such as R.")

(5) Nitrile oxide reaction:

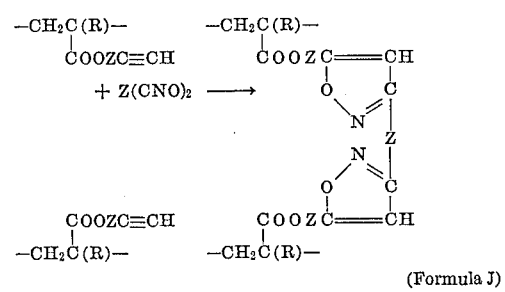

(Formula H)

(5a) Dinitrile oxide reaction (crosslinking):

(Formula J)

(6) Aldehyde and ketone reaction:

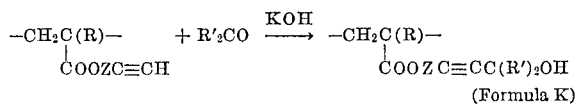

(Formula K)

(6a) Bromination of acetylenic alcohol from 6: ↓Br₂

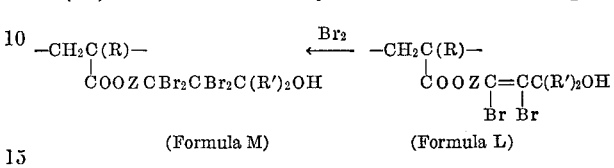

(Formula M)        (Formula L)

(6b) Epoxide reaction with acetylenic alcohol from 6 (diepoxide gives cross-linking):

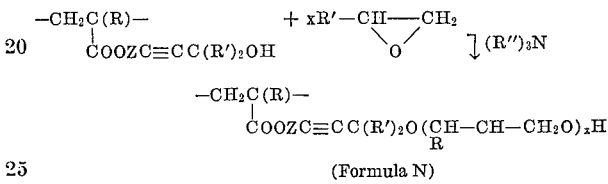

(Formula N)

From the above reactions, it will be noted that the copolymers of this invention are capable of numerous postreactions and post-treatments and that numerous modifications in the properties of the copolymers can be effected.

Since the copolymers can be either random copolymers, wherein the acetylenic repeating units are distributed throughout the length of the linear copolymer, or block copolymers with the acetylenic repeating units either in the middle or at the ends of the linear chain of the copolymer, or in various spaced segments in the linear chain of the copolymer the modified properties effected by the postreaction or post-treatment can be positioned whenever desired in the copolymer molecules. Procedures for preparing block copolymers are disclosed in the aforementioned Pat. No. 3,309,423 and on page 827 of the Journal of Polymer Science, vol. 5 (1967).

The bromination and decaboronation reactions are effected using conditions similar to those for the addition of the corresponding reagents to more simple acetylenic compounds.

The Mannich reaction for the replacement of the hydrogen on a terminal acetylenic group with an aminomethyl radical likewise uses the conditions suitable for corresponding reactions for more simple acetylenic compounds. As defined above, the R' can represent hydrogen, or the various aliphatic, cycloaliphatic or aromatic hydrocarbon groups indicated above. The resulting products can be used as rust inhibitors, interfacial agents, antifoam agents, acid absorbers, etc.

The reaction with nitrile oxides (R"CNO) produces an oxazoline ring as shown in the reaction above. This postreaction raises the softening point of the copolymer by at least 100° C. When a dinitrile oxide is used, crosslinking can be effected, also as shown in the reactions above.

By reaction of the acetylenic repeating unit with aldehydes or ketones, alcohol groups can be introduced. With formaldehyde, the resulting alcohol group is a primary alcohol group, with other aldehydes the resulting groups are secondary alcohol groups, and with ketones the products have tertiary alcohol groups. When sufficient alcohol groups are added, the polymers are made soluble enough to be dissolved in alcohol and in some cases in water. Consequently, this reaction can be used to produce thickening agents.

The alcohols produced as described above still have an acetylenic radical in the same repeating units and therefore the polymer may be postbrominated. The alcohol group can also be reacted with ethylene oxide or other epoxide and such addition continued until the product is definitely soluble in water. This reaction when catalyzed by a tertiary amine can be effected at room temperature. The use of diepoxides can effect crosslinking of the polymer molecules.

The acetylenic polymers can be converted to various metallic derivatives by dissolving or suspending the polymer in liquid ammonia and then adding $NaNH_2$ or forming the same in situ by adding metallic sodium to the liquid ammonia. The resulting sodium acetylide derivative can be used in various reactions, such as substitution of alkyl or other groups by reaction with an alkyl halide, or other metals such as copper, zinc, cobalt, etc. can be substituted for the sodium by adding the corresponding salt to a dioxane solution of the sodium salt of the polymer. Lithium salts can also be made by reaction of the polymer with butyllithium and the corresponding subsequent reactions can be performed as in the case with the sodium salt.

In these various postreactions, there are generally some of the original acetylenic repeating units remaining unreacted in the ultimate copolymer so that the ultimate copolymer has a variety of repeating units including that derived from the comonomer, such as styrene, methylmethacrylate, etc., also from unreacted acetylenic repeating units, and the repeating units resulting from the post-reaction as indicated above in the various reactions.

The practice of this invention is best illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

EXAMPLE I

General procedure for anionic copolymerization

A 5-necked glass flask is used as the reaction vessel. This is connected with an evacuation means for producing a high-vacuum and fitted with an externally driven magnetic stirrer, one of the side arms of the flask being attached to a 50-ml. round-bottomed flask and also fitted with a stopcock crowned with a serum cap, and a helium inlet tube. A solution of about 50% total monomer mixture in tetrahydrofurane is stored over calcium hydride in the round-bottom flask for at least 8 hours and then degassed twice at $3 \times 10^{-6}$ mm. Hg. The reaction vessel is flamed in a stream of helium and then the monomer and the solvent are distilled into the reaction vessel. The system is then pressured with helium to slightly above atmospheric pressure and the reaction vessel then cooled to the desired temperature. In most cases, unless otherwise specified, this temperature is $-40°$ C. Then initiator solution, in most cases sodium naphthalene solution is injected volumetrically by means of a hypodermic syringe through the serum cap. The initiator to monomer mole ratio is usually about 1:40. The copolymerization is allowed to proceed with continued agitation until no further increase in viscosity is observed. The initiator is then destroyed by injection of 3 parts of methanol into the solution mixture. The resultant copolymers are isolated by precipation in a non-solvent, redissolved and if high purity products are desired reprecipitated 3 times in a suitable solvent-non-solvent system. The polymer solutions are filtered through sintered discs before reprecipitation. For purification of acrylonitrile copolymers, dimethylformide is used as the solvent and methanol as the precipitant. With other copolymers, benzene is used as the solvent and heptane as the precipitant. About 0.2% 2,6-di-tert-butyl-p-cresol is used as inhibitor in both solvent and precipitant. The isolated copolymers are dried to constant weight in a vacuum at about 25° C. The filtrate is evaporated under reduced pressure to isolate hexane-soluble polymers if present. The infrared spectra of the monomers and polymers are recorded and the intrinsic viscosities of representative samples of linear polymers are determined.

EXAMPLE Ia

Anionic block copolymerization

Block copolymerization is advantageous in that this permits better control of the number of acetylenic structures and the positioning thereof than is the case with random copolymers.

For anionic block copolymerization, the monomers are added and polymerized individually. Thus, the procedure of Example I is repeated except that only one monomer is used in the initial polymerization and then, instead of destroying the initiator, a second monomer is added and the polymerization is continued possibly with the addition of more initiator. In this way a block copolymer is formed in which the first monomer, such as styrene or methyl methacrylate, forms the center core of the linear polymer chain and the second monomer, such as an acetylenic monomer, forms the terminal portions of the linear polymeric chain. If desired this procedure can be repeated one or more times to give a number of blocks of the respective monomer repeating units through the linear chain. Eventually, when sufficient blocks have been added, the initiator is destroyed and the resultant copolymer processed as in Example I.

EXAMPLE II

Post-bromination

Into a glass-stoppered flask there is placed a solution of 0.6 part of copolymer prepared according to Example I and dissolved in 3 parts of carbon tetrachloride. To this is added twice the theoretical amount of bromine calculated for complete addition to thhe acetylenic groups in the copolymer. The resulting mixture is well agitated to assure thorough mixing and then the flask is stoppered, cooled to 0–20° C. and allowed to stand until the bromine ceases to react. At 0° C., it is generally allowed to stand for a week; at 5° C., for a few hours; and at 20° C., a few minutes is generally sufficient. At the end of this time, 15 parts of heptane is added and the precipitated polymer is isolated by filtration and then redissolved and reprecipitated twice, carbon tetrachloride being used as the solvent and heptane as the precipitant. The resulting copolymer has repeating units represented by Formulas A and B as given above. When the amount of bromine is not greatly in excess of 1 mole per acetylenic group therein, there are more repeating units of Formula A and when a considerable excess over 1 mole of bromine is used there are also repeating units of Formula B and when 2 moles or more of bromine are used, there are more repeating units of Formula B than Formula A. In each case however, there are also repeating units that were present in the starting copolymer. Similar results are obtained using block copolymers prepared as in Example Ia.

EXAMPLE III

Thermal crosslinking

In this procedure, a 10% solution of a copolymer made according to the procedure of Example I is prepared in dry benzene. Samples of the copolymer solution are poured onto glass plates and the solvent allowed to evaporate at room temperature. Then the glass plates with the copolymer layers thereon are placed in an oven at 120° C. for 8 hours. The resultant films are insoluble in chloroform, carbon disulfide, acetone and dimethylformamide. The crosslinked polymer has crosslinkages as shown above by Formula E. Similar results are obtained with block copolymers of Example Ia.

EXAMPLE IV

Free-radical crosslinking

A 10% solution of a copolymer made according to Example I is prepared in benzene. To this solution there is added 0.25% benzoyl peroxide based on the weight of copolymer. After thorough mixing, samples of the resultant copolymer solution are poured on glass plates and the solvent allowed to evaporate. The plates with the layers thereon are placed in an oven at 100° C. for one hour. Films are thereby formed which are insoluble in benzene, acetone, chloroform and dimethylformamide. The crosslinked polymer has crosslinkages as shown above by Formula E. Similar results are obtained when block copolymers of Example Ia are used.

EXAMPLE V

Postreaction with decaborane

Into a round-bottomed 3-necked flask fitted with a reflux condenser, a mechanical stirrer and a nitrogen inlet, there are added about 0.013 mole of a copolymer prepared as in Example I and 5 parts of decaborane, the amount of decaborane being in excess of the stoichiometric amount. To this mixture there is added 1.8 parts of acetonitrile dissolved in 175 parts of dry toluene together with 0.1 part of ditertiary-butyl-p-cresol as inhibitor. This reaction mixture is refluxed for 84 hours at which time the resulting solution is poured into 350 parts of vigorously stirred heptane. The precipitated polymer is isolated by filtration and washed well with heptane to remove any unreacted decaborane. The product is insoluble in carbon tetrachloride, chloroform, and carbon disulfide but is soluble in toluene and acetone. A toluene solution of the polymer is poured into heptane and the precipitated polymers isolated and then dried in a vacuum at room temperature. The pale yellow product is heated on a Fisher-Johns melting point apparatus and the softening point is recorded. This is repeated with similar success with a block copolymer prepared as in Example Ia.

EXAMPLE VI

Mannich reaction (a) Into a round-bottom, 3-necked flask fitted with a mechanical stirrer, a reflux condenser, and a thermometer are placed 0.2 mole of a copolymer prepared according to Example I, 24 parts of diethylamine, 10 parts of paraformaldehyde and 75 parts of dioxane. The reaction mixture is heated on a steam bath with vigorous stirring for 8–24 hours and then subjected to vacuum distillation to recover the product. Analysis shows that the acetylenic groups are still present and that there are also diethylaminomethyl groups present. This material is found to be suitable as a rust-inhibitor, an interfacial agent, an antifoaming agent and an acid absorber.

(b) Similar results and corresponding products are obtained when the above procedure is repeated using in place of the diethylamine, equivalent amounts of dipropylamine, monopropylamine, dihexylamine, diphenylamine, dicyclohexylamine, dibenzylamine, ditolylamine, monophenylamine, dimethylamine and ammonia except that when ammonia and the volatile amines are used, pressure equipment is used to prevent loss of the ammonia or amine by excessive pressure. Actually, it is found advantageous in such cases to conduct the reaction for a short while at a lower temperature and then gradually raise the temperature to that obtained on a steam bath. In each case satisfactory results are obtained. Similar results are obtained with block copolymers of Example Ia.

EXAMPLE VII

Postreaction with nitrile oxide (a) The procedure of Example VI is repeated using in place of the amine and the paraformaldehyde of that example 0.33 mole of phenylnitrile oxide. In each case the postreacted resin product has a softening point of at least 100° C. above that of the starting copolymer.

(b) Similar results are obtained when the phenylnitrile oxide is replaced by an equivalent amount of other nitrile oxides in which the phenyl group is replaced by propyl, amyl, octyl, tolyl, phenethyl, naphthyl, cyclohexyl, methylcycloheptyl and cyclohexylmethyl respectively. In each case the softening point of the resultant resin is at least 100° C. above that of the starting copolymer.

(c) When the procedure of (a) is repeated using an equivalent amount of phenylene nitrile oxide, a crosslinked thermostat resin is obtained.

EXAMPLE VIII

Post-treatment with aldehydes and ketones (a) Into a 3-necked flask equipped with stirrer, reflux condenser, and a thermometer there are placed 0.2 mole of a copolymer prepared as in Example I, 0.33 mole of paraformaldehyde and 75 parts of dry dioxane and 0.25 part of NaOH. The reaction mixture is stirred and heated on a steam bath for 12 hours and then subjected to vacuum distillation for removal of solvent and recovery of the product. Upon testing, the product is found to still have its acetylenic linkage and to have added thereto a methylol group.

(b) The procedure of the proceeding paragraph is repeated a number of times using individually in place of the paraformaldehyde an equivalent weight of acetaldehyde, benzaldehyde, beta-phenylacetaldehyde and beta-cyclohexylacetaldehyde. In each case the postreacted product is found to still have the acetylenic group intact and to have added thereto secondary alcohol groups.

(c) The procedure of the above paragraph (a) is repeated a number of times using individually in place of the paraformaldehyde an equivalent weight of acetone, diphenylketone, diethylketone, methylethylketone and dicyclohexylketone. In each case the postreacted product is found to have retained its acetylenic group and to have added thereto tertiary alcohol groups.

EXAMPLE IX

Postbromination of a polymeric acetylenic alcohol (a) The procedure of Example II is repeated except that in place of the copolymer of Example I, there is used an equivalent amount of polymeric acetylenic alcohol produced in Example VIII(a). The resulting copolymer has repeating units represented by the Formula L and Formula N as given above. When the amount of bromine is not greatly in excess of 1 mole per acetylenic group therein, the postreacted polymer product has a substantial number of repeating units of Formula L therein, as well as repeating units of the starting copolymer. When a considerable excess of bromine used is over the mole per mole ratio, there are also present repeating units of Formula M as well as the other repeating units indicated above, particularly when more than 2 moles of bromine are used per acetylenic group.

EXAMPLE X (a) The acetylenic alcohols of Example VIII are made more water soluble by reaction with one or more moles of ethylene oxide per acetylenic group using 15–20 p.s.i. and 35° C. with an amount of LiOH in methanol to give about 1% LiOH based on total weight of reagents.

(b) The procedure of paragraph (a) when repeated with propylene oxide gives similar results.

(c) When the procedure of above paragraph (a) is repeated using an equivalent amount of butane diepoxide, using tributylamine to catalyze the reaction at room temperature, a crosslinked insoluble polymer is obtained.

EXAMPLE XI

Postreacted to produce metallic derivatives (a) A copolymer produced according to the procedure of Example I is dissolved or maintained in suspension in liquid ammonia and a solution of sodamide in liquid ammonia is added thereto in sufficient proportion to provide a slight excess of one mole of sodamide per acetylenic group in the copolymer. In place of the sodamide solution, the sodamide can be formed in situ by adding small pieces of metallic sodium to the liquid ammonia. The reaction is continued for a period of about 2 hours after the desired amount of sodamide or sodium has been added. The polymeric metallic derivative is recovered by allowing the ammonia to evaporate gradually and then the precipitate is dissolved in dioxane and the resulting solution is filtered. Tests on the polymeric product show that the sodium has replaced the hydrogen in the terminal acetylenic groups.

(b) The polymer metallic derivative is dissolved or suspended in dioxane and reacted with dioxane solutions or suspensions of copper chloride, zinc chloride and cobalt chloride respectively to replace the sodium by the respective other metals.

(c) An alkyl radical is added onto the acetylenic group in place of the sodium by adding an alkyl halide gradually to a dioxane solution of the sodium acetylene polymer. In this case the alkyl group replaces the sodium and sodium chloride is precipitated. The alkyl acetylene derivative polymer is subsequently recovered by dissolving in ether or dioxane and separated from the precipitated salt by filtration.

(d) Lithium is added to the acetylenic group by substituting butyl lithium for the sodamide used above in paragraph (a).

EXAMPLE XII

The procedure of Example I is repeated three times using the following monomeric mixtures respectively:
 (a) 75 parts styrene, 25 parts 3-butyn-1-yl acrylate.
 (b) 50 parts styrene, 50 parts 3-butyn-1-yl acrylate.
 (c) 90 parts styrene, 10 parts 3-butyn-1-yl acrylate.
 (d) Each of the three above products is postbrominated according to the procedure of Example II to give brominated products having repeating units shown in the above Formulas A and B.
 (e) Each of the three above products is decaboronated according to the procedure of Example V and the decaboronated products have repeating units having the above Formulas C and D.
 (f) Each of the three above products is crosslinked both thermally and also with 10% styrene monomer according to the procedures of Examples III and IV and the crosslinked copolymers have crosslinkages shown in Formulas E and F.
 (g) Each of the three above products is post-treated with formaldehyde and diethylamine according to Example VI and the reaction products have repeating units of Formula G.
 (h) Each of the three above products is reacted with phenylnitrile oxide according to the procedure of Example VII(a) and the reaction products have repeating units corresponding to above Formula H.
 (i) Each of the three above products is reacted with formaldehyde according to the procedure of Example VIII(a) and the reaction products have repeating units corresponding to above Formula K.
 (j) The products prepared according to preceding paragraph (i) are brominated according to the procedure of Example IX using 2.5 moles of bromine per acetylenic group present in the polymer and the brominated products have repeating units therein of the above Formulas L and M.

(k) Each of the acetylenic alcohol products from Paragraph (i) is reacted with ethylene oxide according to the procedure of Example X(a) and the reaction products have repeating units therein of the above Formula N.

(1) Each of the three above products from (a), (b) and (c) is suspended or dissolved in liquid ammonia and reacted with sodamide according to the procedure of Example XI(a) and the reaction products have repeating units therein of the formula shown below as Formula O'. Portions of these products are further reacted with CuCl as in Example XI(b) and these products have repeating units therein of the formula shown below as Formula P'.

(m) Each of the above procedures of paragraphs (a) through (1) is repeated using the block copolymerization technique of Example Ia to produce a center core of styrene in the linear chain and terminal portions of the acetylenic repeating units. In each of the postreactions, similar repeating units are obtained as with the random copolymers used above but the postreacted repeating units are at the two ends of the block copolymers.

The repeating units in the various products produced in the above example have the following structural formulas. In each product the repeating units from styrene are present. In the (a), (b) and (c) products the repeating units from 3-butyn-1-yl acrylate are also present, and these repeating units are present in each of the subsequent reaction products to the extent that they remain unreacted.

From styrene:

—CH₂CH—
  |
  C₆H₅

From 3-butyn-1-yl-acrylate:

—CH₂CH—
  |
  COOCH₂CH₂C≡CH

The following repeating units are also present in various products as indicated below:

In the (d) products:

(Formula A')  (Formula B')

In the (e) products:

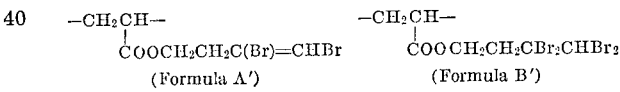

(Formula C')  (Formula D')

In the (f) products:

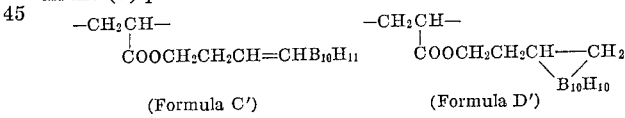

(Formula E')  (Formula F')

In the (g) products:

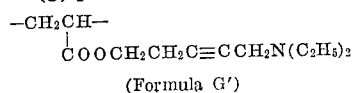

(Formula G')

In the (h) products:

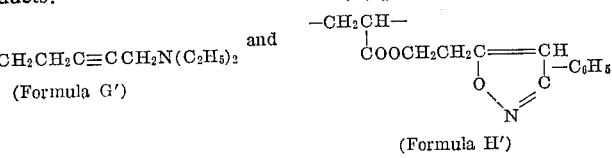

(Formula H')

In the (i) products:

$$-CH_2CH-$$
$$\phantom{-CH_2}|$$
$$\phantom{-CH_2}COOCH_2CH_2C\equiv CCH_2OH$$

(Formula K′)

and

In the (k) products:

$$-CH_2CH-$$
$$\phantom{-CH_2}|$$
$$\phantom{-CH_2}COOCH_2CH_2C\equiv CCH_2O(CH_2CH_2)O_xH$$

(Formula N′)

In the (j) products:

$$-CH_2CH-$$
$$\phantom{-CH_2}|$$
$$\phantom{-CH_2}COOCH_2CH_2C=C=CCH_2OH$$
$$\phantom{-CH_2COOCH_2CH_2}| \phantom{=} |$$
$$\phantom{-CH_2COOCH_2CH_2}Br \phantom{=} Br$$

(Formula L′)

and $$-CH_2CH-$$
$$\phantom{-CH_2}|$$
$$\phantom{-CH_2}COOCH_2CH_2CBr_2CBr_2CH_2OH$$

(Formula M′)

In the (l) products:

$$-CH_2CH-$$
$$\phantom{-CH_2}|$$
$$\phantom{-CH_2}COOCH_2CH_2C\equiv CNa$$

(Formula O′)

and $$-CH_2CH-$$
$$\phantom{-CH_2}|$$
$$\phantom{-CH_2}COOCH_2CH_2C\equiv CCu$$

(Formula P′)

EXAMPLE XIII

The procedure of Example XII is repeated a number of times including the various postreactions except that in the preparation of the starting copolymers methyl methacrylate is used instead of the styrene. Similar results are obtained in each case, except that in the polymer structures, the repeating unit for methyl methacrylate is present instead of the repeating unit for styrene. This repeating unit has the structure $$-CH_2C(CH_3)-$$
$$\phantom{-CH_2}|$$
$$\phantom{-CH_2}COOCH_3$$

The repeating units for the 3-butyn-1-yl acrylate are the same as obtained in Example XII and the repeating units for the various postreaction products of these repeating units are the same as obtained in the corresponding postreactions for Example XII.

EXAMPLE XIV

The procedure of Example XII is repeated a number of times using individually in place of the styrene the following comonomers respectively: vinyl naphthalene, vinyl toluene, p-chlorostyrene, ethyl acrylate, vinyl chloride, acrylonitrile, vinylidene chloride, vinyl acetate, vinyl benzoate, α-methyl styrene, isopropenyl propionate, methacrylonitrile and cyclohexyl acrylate. In each case similar results are obtained as in Example XII except that the corresponding repeating units of the respective comonomers employed in this example are substituted for the repeating units for the styrene used in Example XII. The repeating units for the the acetylenic monomer and for the various postreacted repeating units are similar to those described in Example XII.

EXAMPLE XV

The procedure of Example XII is repeated a number of times using the corresponding methacrylate in place of the 3-butyn-1-yl acrylate. Similar results are obtained as in Example XII except that in the various copolymers, the repeating units of the acetylenic methacrylate have the following repeating unit structure:

$$-CH_2C(CH_3)-$$
$$\phantom{-CH_2}|$$
$$\phantom{-CH_2}COOCH_2CO_2C\equiv CH$$

The various postreacted products have repeating unit structures similar to those described in Example XII except that in the upper portion of each of the repeating units the structure is $-CH_2C(CH_3)-$ instead of $-CH_2CH-$.

EXAMPLE XVI

The procedure of Example XII is repeated a number of times using individually in place of the 3-butyn-1-yl acrylate, the following acetylenic monomers:

(a) 3-butyn-2-yl acrylate
(b) 3-butyn-2-yl methacrylate
(c) 1-phenyl-3-butyn-1-yl acrylate
(d) 1-cyclohexyl-3-butyn-1-yl acrylate
(e) 2-benzyl-3-butyn-1-yl methacrylate
(f) 4-pentyne-2-yl acrylate
(g) 2-phenethyl-4-pentyn-2-yl methacrylate
(h) p-ethynylphenyl acrylate
(i) p-ethynylbenzyl methacrylate
(j) 4-ethynylcyclohexyl acrylate In each case similar products are obtained as in Example XII, and the various copolymers have in addition to the repeating units derived from styrene. the following repeating units respectively:

(a) $-CH_2CH-$
$\phantom{(a)}|$
$\phantom{(a)}COOCH(CH_3)C\equiv CH$ (b) $-CH_2C(CH_3)-$
$\phantom{(b)}|$
$\phantom{(b)}COOCH(CH_3)C\equiv CH$ (c) $-CH_2CH-$
$\phantom{(c)}|$
$\phantom{(c)}COOCHCH_2C\equiv CH$
$\phantom{(c)COOC}|$
$\phantom{(c)COOC}C_6H_5$ (d) $-CH_2CH-$
$\phantom{(d)}|$
$\phantom{(d)}COOCHCH_2C\equiv CH$
$\phantom{(d)COOC}|$
$\phantom{(d)COOC}C_6H_{11}$ (e) $-CH_2C(CH_3)-$
$\phantom{(e)}|$
$\phantom{(e)}COOCH_2CHC\equiv CH$
$\phantom{(e)COOCH_2C}|$
$\phantom{(e)COOCH_2C}CH_2C_6H_5$ (f) $-CH_2CH-$
$\phantom{(f)}|$
$\phantom{(f)}COOCH(CH_3)CH_2C\equiv CH$ (g) $-CH_2C(CH_3)-$
$\phantom{(g)}|$
$\phantom{(g)}COOCH(CH_3)CH_2C\equiv CH$
$\phantom{(g)COOC}|$
$\phantom{(g)COOC}CH_2CH_2C_6H_5$ (h) $-CH_2CH-$
$\phantom{(h)}|$
$\phantom{(h)}COOC_6H_4C\equiv CH$ (i) $CH_2C(CH_3)-$
$\phantom{(i)}|$
$\phantom{(i)}COOCH_2C_6H_4C\equiv CH$ (j) $-CH_2CH-$
$\phantom{(j)}|$
$\phantom{(j)}COOC_6H_{10}C\equiv CH$ In the various postreacted products of this example, the repeating units derived from the acetylenic units have various groups attached thereto in a manner similar to the attachment of various reagent groups as illustrated in Example XII, but in these cases by addition to the acetylenic groups in the respective acetylenic monomers used in this example.

When $x$ is used in some of the above formulas, this indicates an integer having a value of 1 or more. Where $n$ is used this indicates a plurality of groups, that is at least 2 and preferably at least 4.

The copolymers of this invention advantageously have a molecular weight of at least 500 and preferably at least 5000. There is no upper limit since this is generally determined by practical considerations. However, there is generally no particular advantage in exceeding molecular weights of about 800,000.

Preferred comonomers for use in preparing the copolymers of this invention are the vinyl and vinylidene comonomers represented by the formula:

$$CH_2=C-R'''$$
$$\phantom{CH_2=C-}|$$
$$\phantom{CH_2=C-}Y$$

and the repeating units derived from such comonomers are represented by the formula $$-CH_2C(R''')-$$
$$\phantom{-CH_2C-}|$$
$$\phantom{-CH_2C-}Y$$

In these formulas, R''' represents hydrogen or the methyl or cyano radical, preferably hydrogen or methyl; Y represents:

(a) Hydrocarbon, including alkyl, aryl, alkaryl, aralkyl, cycloalkyl, alkylcycloalkyl, cycloalkyl-alkyl;

(b) Cyano; and (c) —COOR'' wherein R'' is as defined above.

The hydrocarbon groups of R' and R'' preferably have 1–8 carbon atoms. Typical repeating units for such comonomers are those of methyl acrylate, acrylonitrile and vinyl toluene which have the following structures respectively.

$$-CH_2CH-;\quad -CH_2CH-;\quad \text{and}\quad -CH_2CH-$$
$$\phantom{-CH_2}|\phantom{H-;\quad -CH_2}|\phantom{H-;\quad \text{and}\quad -CH_2}|$$
$$\phantom{-CH_2}COOCH_3\phantom{-;\quad -CH_2}CN\phantom{-;\quad \text{and}\quad -CH_2}C_6H_4CH_3$$

Typical examples of the comonomers of the above formula that can be used in preparing the copolymers of this invention include the following: styrene, α-methylstyrene, vinyl toluene, vinyl xylene, isopropenyl toluene, vinyl naphthalene, isopropenyl naphthalene, vinyl diphenyl, isopropenyldiphenyl, ethylene, propylene, butene-1, 2-methyl-butene-1, hexene-1, 2-methyl-hexene-1, decene-1, 3-phenylpropene-1, 4-phenylbutene-1, 2-methyl-3-phenylbutene-1, vinyl cyclohexane, vinyl cycloheptane, vinyl methylcyclohexane, vinyl methylcycloheptane, 3-cyclohexyl-butene-1, 2-methyl-3-cycloheptyl-butene-1, 4-cyclopentyl-pentene-1, acrylonitrile, methacrylonitrile, vinylidene cyanide, methyl α-cyanoacrylate, methyl methacrylate, methyl acrylate, ethyl acrylate, propyl methacrylate, phenyl acrylate, phenyl methacrylate, benzyl acrylate, naphthyl acrylate, cyclohexyl acrylate, cyclohexyl methacrylate, etc.

Typical hydrocarbon monovalent radicals as represented by R', R'' and R''' include: methyl ethyl, propyl, butyl, amyl, hexyl, heptyl, octyl, decyl, phenyl, tolyl, xylyl, naphthyl, metylnaphthyl, ethylnaphthyl, diphenyl, methyldiphenyl, benzyl, phenethyl, phenylpropyl, cyclohexyl, cyclohexylmethyl, cycloheptyl, methylcycloheptyl. While the hydrocarbon groups listed above do not contain ethylenic unsaturation, groups containing unsaturation can be used provided that the unsaturation does not cause premature crosslinking of the linear copolymers. However, there is no particular advantage in their use. Generally, it is preferable to use alkyl, aryl, aralkyl, alkaryl, cycloalkyl, alkylcycloalkyl and cycloalkyl-alkyl groups.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A linear polymeric composition having an average polymeric molecular weight of at least 5,000 and having a plurality of acetylenic repeating units in the polymeric molecules in which the repeating units of the linear polymeric molecules comprise 1–85 acetylenic repeating units per 100 repeating units in the polymeric molecules, said acetylenic repeating units having the formula:

$$-CH_2C(R)-$$
$$\phantom{-CH_2C-}|$$
$$\phantom{-CH_2C-}COOZC\equiv CH$$

wherein R represents hydrogen or methyl, Z is a divalent hydrocarbon radical of 2–10 carbon atoms, and the remainder of said linear polymeric molecules consisting essentially of repeating units derived from a polymerizable comonomer selected from the class consisting of vinyl and vinylidene comonomers.

2. A polymer of claim 1 in which the remainder of said polymeric molecules consists essentially of repeating units having the formula:

$$-CH_2CH-$$
$$\phantom{-CH_2}|$$
$$\phantom{-CH_2}C_6H_5$$

3. A polymer of claim 1 in which the remainder of said polymeric molecules consists essentially of repeating units having the formula:

$$-CH_2CH-$$
$$\phantom{-CH_2}|$$
$$\phantom{-CH_2}COOCH_3$$

4. A polymer of claim 1 in which the remainder of said polymeric molecules consists essentially of repeating units having the formula:

$$-CH_2C(CH_3)-$$
$$\phantom{-CH_2C(CH}|$$
$$\phantom{-CH_2C(CH}COOCH_3$$

5. A polymer of claim 1 in which the remainder of said polymeric molecule consists essentially of repeating units having the formula:

$$-CH_2CH-$$
$$\phantom{-CH_2}|$$
$$\phantom{-CH_2}CN$$

6. A polymer of claim 1 in which the remainder of said polymeric molecule consists essentially of repeating units having the formula:

$$-CH_2CH-$$
$$\phantom{-CH_2}|$$
$$\phantom{-CH_2}OOCCH_3$$

7. A postbrominated polymer of claim 1 in which said polymer molecule in addition to the repeating units recited in claim 1 also contain at least one repeating unit selected from the class of consisting of:

$$-CH_2C(R)-\qquad \text{and}\qquad -CH_2C(R)-$$
$$\phantom{-CH_2}|\phantom{C(R)-\qquad \text{and}\qquad -CH_2}|$$
$$\phantom{-CH_2}COOZC=CHBr\phantom{\qquad \text{and}\qquad}COOZCBr_2CHBr_2$$
$$\phantom{-CH_2COOZC=CH}|$$
$$\phantom{-CH_2COOZC=CH}Br$$

8. A polymer of claim 1 postreacted with formaldehyde and an amine of the formula $R'_2NH$, wherein R' is hydrogen or a hydrocarbon radical of 1–8 carbon atoms, and having in addition to the polymeric repeating units recited in claim 1 a plurality of repeating units:

$$-CH_2C(R)-$$
$$\phantom{-CH_2}|$$
$$\phantom{-CH_2}COOZC=CCH_2NR'_2$$

9. A polymer of claim 1 postreacted with a nitrile oxide having the formula R''CNO wherein R'' is a hydrocarbon radical of 1–8 carbon atoms and having in addition to the polymeric repeating units recited in claim 1 a plurality of repeating units:

$$-CH_2C(R)-$$
$$\phantom{-CH_2}|$$
$$\phantom{-CH_2}COOZC=CH$$
$$\phantom{-CH_2COOZ}\diagdown\phantom{=}\diagup$$
$$\phantom{-CH_2COOZ}O\phantom{=}C-R''$$
$$\phantom{-CH_2COOZ}\diagdown\phantom{=}\diagup$$
$$\phantom{-CH_2COOZO}N$$

10. A polymer of claim 1 postreacted with $R'_2CO$ wherein R' is hydrogen or a hydrocarbon radical of 1–8 carbon atoms and having in addition to the polymeric repeating units recited in claim 1 a plurality of repeating units:

$$-CH_2C(R)-$$
$$\phantom{-CH_2}|$$
$$\phantom{-CH_2}COOZC=CC(R')_2OH$$

11. A postbrominated polymer of claim 1 in which said polymer molecule in addition to the repeating units recited in claim 1 also contain at least one repeating unit selected from the class consisting of:

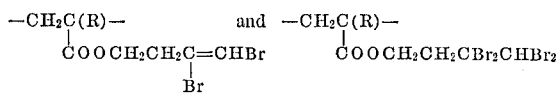

12. A polymer of claim 1 postreacted with formaldehyde and an amine of the formula R'$_2$NH, wherein R' is hydrogen or a hydrocarbon radical of 1–8 carbon atoms, and having in addition to the polymeric repeating units recited in claim 1 a plurality of repeating units:

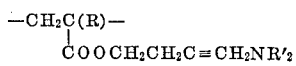

13. A polymer of claim 1 postreacted with a nitrile oxide having the formula R"CNO, wherein R" is a hydrocarbon radical of 1–8 carbon atoms, and having in addition to the polymeric repeating units recited in claim 1 a plurality of repeating units:

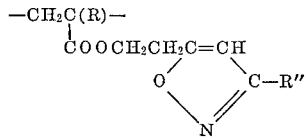

References Cited
UNITED STATES PATENTS

| | | | |
|---|---|---|---|
| 3,183,216 | 5/1965 | Cohen et al. | 260—89.5 |
| 3,254,115 | 5/1966 | Cohen et al. | 260—486 |
| 3,293,226 | 12/1966 | de Schrijver | 260—96HAL |
| 3,437,688 | 4/1969 | Schwartz | 260—486 |

OTHER REFERENCES

Roberts: Basic Principles of Organic Chemistry, published by W. A. Benjamin, Inc., New York, N.Y. (1964), pp. 216.

HARRY WONG, Jr., Primary Examiner

U.S. Cl. X.R.

117—124; 260—29.6, 30.4, 32.4, 32.8, 33.2, 33.4, 33.6, 45.7, 66, 78.5, 80.72, 80.73, 80.75, 80.81, 85.5, 86.1, 86.3, 86.7, 885, 901